(12) United States Patent
Iwama et al.

(10) Patent No.: US 11,092,233 B2
(45) Date of Patent: Aug. 17, 2021

(54) PLANETARY CARRIER AND METHOD FOR MANUFACTURING THE SAME

(71) Applicant: AISIN AW CO., LTD., Anjo (JP)

(72) Inventors: Takashi Iwama, Aichi (JP); Takaaki Kawashima, Aichi (JP); Junya Abe, Aichi (JP); Yuuji Esaki, Aichi (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 16/630,265

(22) PCT Filed: Sep. 5, 2018

(86) PCT No.: PCT/JP2018/032846
§ 371 (c)(1),
(2) Date: Jan. 10, 2020

(87) PCT Pub. No.: WO2019/049885
PCT Pub. Date: Mar. 14, 2019

(65) Prior Publication Data
US 2021/0088125 A1 Mar. 25, 2021

(30) Foreign Application Priority Data
Sep. 5, 2017 (JP) .............................. JP2017-170616

(51) Int. Cl.
*F16H 3/62* (2006.01)
*F16H 57/08* (2006.01)

(52) U.S. Cl.
CPC ............ *F16H 57/082* (2013.01); *F16H 3/62* (2013.01)

(58) Field of Classification Search
CPC ..... F16H 1/28; F16H 1/36; F16H 3/62; F16H 57/082

(Continued)

(56) References Cited

U.S. PATENT DOCUMENTS 5,470,286 A * 11/1995 Fan .................. F16H 57/082
475/331
6,651,336 B1 * 11/2003 Bauknecht ............ F16H 57/082
29/893

(Continued)

FOREIGN PATENT DOCUMENTS

CN      205013666 U    2/2016
CN      205331327 U    6/2016

(Continued)

OTHER PUBLICATIONS

Espacenet machine translation of DE 102014208003 A1; http://translationportal.epo.org/emtp/translate/?ACTION=description-retrieval&COUNTRY=DE&ENGINE=google&FORMAT=docdb&KIND=A1&LOCALE=en_EP&NUMBER=102014208003&OPS=ops.epo.org/3.2&SRCLANG=de&TRGLANG=en (Year: 2015).*

(Continued)

*Primary Examiner* — Leslie A Nicholson, III
(74) *Attorney, Agent, or Firm* — Sughrue Mion, PLLC

(57) ABSTRACT

A planetary carrier includes a plurality of pinion gears, a plurality of pinion shafts that are each inserted in the corresponding pinion gear, a first supporting plate that supports one end of each of the pinion shafts, a second supporting plate that supports the other end of each of the pinion shafts, and a plurality of bridge plates, one end of each of which is joined to the first supporting plate via a welding portion and the other end of each of which is joined to the second supporting plate via a welding portion and which connects the first and second supporting plates.

5 Claims, 10 Drawing Sheets

(58) Field of Classification Search
USPC .......................................................... 475/331
See application file for complete search history.

(56) References Cited

U.S. PATENT DOCUMENTS

| | | |
|---|---|---|
| 2002/0115524 A1 | 8/2002 | Ohkubo et al. |
| 2006/0183589 A1 | 8/2006 | Naka et al. |
| 2014/0206498 A1 | 7/2014 | Harada et al. |

FOREIGN PATENT DOCUMENTS

| | | | |
|---|---|---|---|
| DE | 117271 A1 | 1/1976 | |
| DE | 102010050604 A1 | 5/2012 | |
| DE | 102014208003 A1 | 10/2015 | |
| DE | 102017120280 A1 * | 9/2018 | ........... F16H 57/082 |
| JP | 49-19740 Y2 | 5/1974 | |
| JP | 56-3351 A | 1/1981 | |
| JP | 2002-243025 A | 8/2002 | |
| JP | 2005-299891 A | 10/2005 | |
| JP | 2006-226375 A | 8/2006 | |
| JP | 2010-169226 A | 8/2010 | |
| JP | 2014-077487 A | 5/2014 | |
| WO | 2013/088860 A1 | 6/2013 | |

OTHER PUBLICATIONS

Espacenet machine translation of JP 2005-299891 A; http://translationportal.epo.org/emtp/translate/?ACTION=description-retrieval&COUNTRY=JP&ENGINE=google&FORMAT=docdb&KIND=A&LOCALE=en_EP&NUMBER=2005299891&OPS=ops.epo.org/3.2&SRCLANG=ja&TRGLANG=en (Year: 2005).*
Communication dated Jun. 12, 2020, from the European Patent Office in application No. 18853682.5.
International Search Report of PCT/JP2018/032846 dated Nov. 13, 2018.

* cited by examiner

PLANETARY CARRIER AND METHOD FOR MANUFACTURING THE SAME

CROSS REFERENCE TO RELATED APPLICATIONS

This application is a National Stage of International Application No. PCT/JP2018/032846 filed Sep. 5, 2018, claiming priority based on Japanese Patent Application No. 2017-170616 filed Sep. 5, 2017.

TECHNICAL FIELD

The disclosure relates to a planetary carrier and a method for manufacturing the same, the planetary carrier including a plurality of pinion gears and a plurality of pinion shafts that are each inserted in the corresponding pinion gear.

BACKGROUND ART

Conventionally, a planetary carrier that includes a carrier plate and a carrier base that are formed by press working a plate material having a prescribed thickness is known as this type of planetary carrier (for example, see Patent Document 1). The carrier plate of the planetary carrier has an annular base portion and a plurality of leg portions that are bent from an outer peripheral surface of the base portion toward the carrier base. The carrier base has a plurality of arcuate holes that are formed at positions corresponding to the leg portions of the carrier plate. The leg portions of the carrier plate are inserted in the corresponding arcuate hole of the carrier base and welded to the carrier base.

Conventionally, a planetary carrier that includes a plurality of pinion gears, a pair of carrier members that are disposed on both sides across the pinion gears in the axial direction and that shaft-support each of the pinion gears, and a plurality of stud pins is also known (for example, see Patent Document 2). In the planetary carrier, the stud pins are disposed between the pinion gears in a rotational direction of a planetary gear unit in order to resolve an issue resulting from welding during manufacture. Both ends of each stud pin are fixed to the carrier members by clinching.

RELATED ART DOCUMENTS

Patent Documents

Patent Document 1: Japanese Unexamined Patent Application Publication No. 2014-77487 (JP 2014-77487 A)
Patent Document 2: Japanese Unexamined Patent Application Publication No. 2002-243025 (JP 2002-243025 A)

SUMMARY OF THE DISCLOSURE

Problem to be Solved by the Various Aspect of the Disclosure

The carrier plate of the planetary carrier according to Patent Document 1 has the leg portions that are extended radially from the annular base portion and the carrier plate has a complicated planar shape. The size of a base material that is needed to acquire a prescribed number of carrier plates is large. The amount of end materials that are wasted is increased and thus, material yield is deteriorated. Similarly, for the carrier base having an annular planar shape, the increase in the size of the base material and the deterioration of material yield are not easily suppressed. Thus, with the planetary carrier according to Patent Document 1, it is difficult to further reduce the material cost. Although the planetary carrier according to Patent Document 2 can be manufactured without using welding, it is difficult to sufficiently ensure the strength of the planetary carrier just by fixing the stud pins to the pair of carrier members by clinching.

An aspect of the disclosure is to satisfactorily ensure the strength of a planetary carrier while satisfactorily reducing the manufacturing cost.

The planetary carrier of the disclosure is a planetary carrier that includes a plurality of pinion gears and a plurality of pinion shafts that are each inserted in the corresponding pinion gear. The planetary carrier includes a first supporting plate that supports one end of each of the pinion shafts, a second supporting plate that supports the other end of each of the pinion shafts, and a plurality of bridge plates, one end of each of which is joined to the first supporting plate via a welding portion and the other end of each of which is joined to the second supporting plate via a welding portion and which connects the first and second supporting plates.

In the planetary carrier, one end of each bridge plate is joined to the first supporting plate via the welding portion and the other end is joined to the second supporting plate via the welding portion and thus, the first and second supporting plates are connected by the bridge plates. The strength of the planetary carrier can therefore be satisfactorily ensured. In the planetary carrier, the planar shape of the first and second supporting plates and the bridge plate can be simplified. In this way, it is possible to decrease the size of the base materials of the first and second supporting plates and the bridge plate and improve material yield so as to decrease the material cost. A decrease amount of the material cost is sufficiently larger than an increase amount of the working cost resulting from the increase in the number of spots to weld. As a result, with this planetary carrier, it is possible to satisfactorily ensure the strength thereof and satisfactorily reduce the manufacturing cost.

DETAILED DESCRIPTION

Modes for carrying out the various aspects of the disclosure will be described below with reference to the drawings.

Figure 1:
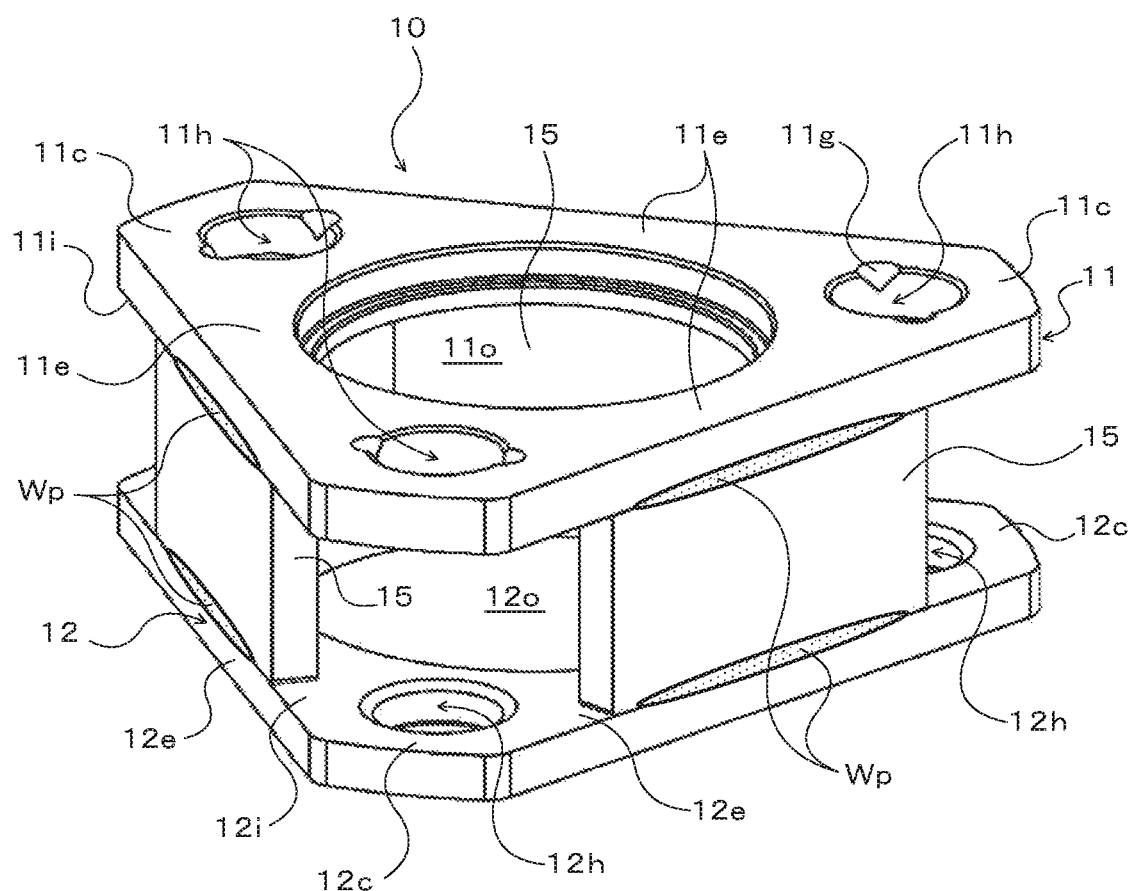
FIG. 1 is a perspective view of a planetary carrier of the disclosure.
Figure 2:
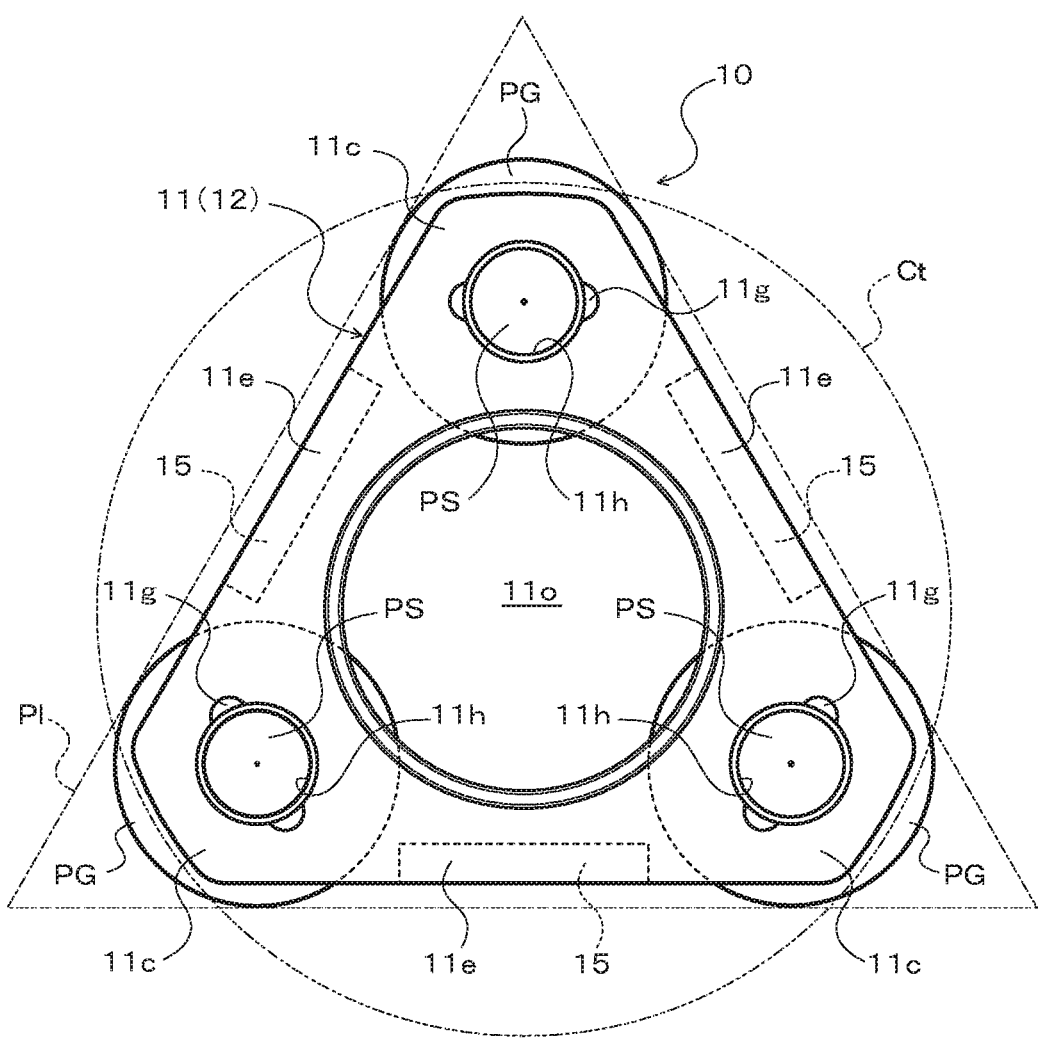
FIG. 2 is a plan view of the planetary carrier illustrated in FIG. 1.

FIG. 1 is a perspective view of a planetary carrier 10 of the disclosure. FIG. 2 is a plan view of the planetary carrier 10. The planetary carrier 10 illustrated in the drawings are included in a single-pinion type planetary gear that is applied to a transmission. The planetary carrier 10 includes a plurality of (three in the embodiment, for example) pinion gears PG and a plurality of (three in the embodiment, for example) pinion shafts PS that are each inserted in the corresponding pinion gear PG (in FIG. 1, both are not shown). The planetary carrier 10 also includes a first supporting plate 11 that supports one end of each pinion shaft PS, a second supporting plate 12 that supports the other end of each pinion shaft PS, and a plurality of (three in the embodiment, for example) bridge plates 15 that connect the first and second supporting plates 11, 12.

The first supporting plate 11 is formed by blanking (press working) a metal plate such as a steel plate. The first supporting plate 11 includes a flat outer face and a flat inner face 11$i$ (see FIG. 1), a circular hole (through hole) 11$o$ that is extended concentrically with an axis of the planetary carrier 10, a plurality of peripheral portions 11$e$ that are extended linearly around the circular hole 11$o$, and a plurality of corner portions 11$c$ that connect the peripheral portions 11$e$ that are adjacent to each other.

In the embodiment, the first supporting plate 11 has the same number of peripheral portions 11$e$ as that of the pinion gears PG and the bridge plates 15, that is, the first supporting plate 11 has three peripheral portions 11$e$. A side face of each peripheral portion 11$e$ is formed to be flat. An angle formed by the side faces of two adjacent peripheral portions 11$e$ via the corner portion 11$c$ is 60 degrees. In this way, the first supporting plate 11 has a planar shape with a generally equilateral triangle shape (polygonal shape), as illustrated in FIG. 2. In the embodiment, the first supporting plate 11 is formed so that the side face of each peripheral portion 11$e$ is positioned radially inward (on the circular hole 11$o$ side, that is, on the axis side of the planetary carrier 10) relative to the corresponding peripheral portion of a polygon (triangle) PI (see FIG. 2) that is circumscribed to the pinion gears PG (addendum circle) when the planetary carrier 10 is viewed in plan. The first supporting plate 11 is formed so that the side face of each peripheral portion 11$e$ is positioned radially outward relative to the corresponding peripheral portion of the polygon (triangle) that is circumscribed to a plurality of shaft holes 11$h$ when the planetary carrier 10 is viewed in plan.

The shaft hole 11$h$ is formed on each corner portion 11$c$ of the first supporting plate 11, an end of the pinion shaft PS that is inserted in the pinion gear PG being inserted in the shaft hole 11$h$. A clinching groove 11$g$ is formed around each shaft hole 11$h$, the clinching groove 11$g$ being for clinching an end of the pinion shaft PS that is inserted in the shaft hole 11$h$. A side face of each corner portion 11$c$ has a chamfered shape (rounded shape) so that the side face of the corner portion 11$c$ is smoothly continuous with the side face of the corresponding peripheral portion 11$e$ and so that stress concentration is alleviated.

The second supporting plate 12 is formed by blanking (press working) a metal plate such as a steel plate. The second supporting plate 12 includes a flat outer face and a flat inner face 12$i$ (see FIG. 1), a circular hole (through hole) 12$o$ that is extended concentrically with the axis of the planetary carrier 10, a plurality of peripheral portions 12$e$ that are each extended linearly around the circular hole 12$o$, and a plurality of corner portions 12$c$ that connect the peripheral portions 12$e$ that are adjacent to each other. In the embodiment, the second supporting plate 12 has the same structure as that of the first supporting plate 11 described above. That is, the second supporting plate 12 has a planar shape with a generally equilateral triangle shape (polygonal shape) that is the same as that of the first supporting plate 11. The second supporting plate 12 also includes the same number of peripheral portions 12$e$ as that of the pinion gears PG and the bridge plates 15, that is, the second supporting plate 12 includes three peripheral portions 12$e$. The second supporting plate 12 is also formed so that a side face of each peripheral portion 12$e$ is positioned radially inward (on the circular hole 12$o$ side, that is, on the axis side of the planetary carrier 10) relative to the corresponding peripheral portion of the polygon (triangle) PI (see FIG. 2) that is circumscribed to the pinion gears PG when the planetary carrier 10 is viewed in plan. The second supporting plate 12 is also formed so that the side face of each peripheral portion 12$e$ is positioned radially outward relative to the corresponding peripheral portion of the polygon (triangle) that is circumscribed to a plurality of shaft holes 12$h$ when the planetary carrier 10 is viewed in plan.

The shaft hole 12$h$ is formed on each corner portion 12$c$ of the second supporting plate 12, the other end of the pinion shaft PS that is inserted in the pinion gear PG being inserted in the shaft hole 12$h$. A clinching groove (not shown) is formed around each shaft hole 12$h$. Here, the clinching groove is for clinching the other end of the pinion shaft PS that is inserted in the shaft hole 12$h$. A side face of each peripheral portion 12$e$ is formed to be flat. A side face of each corner portion 12$c$ has a chamfered shape (rounded shape) so that the side face of the corner portion 12$c$ is smoothly continuous with the side face of the corresponding peripheral portion 12$e$ and so that stress concentration is alleviated.

Each bridge plate 15 is formed by blanking (press working) a metal plate such as a steel plate so that the bridge plate 15 has a flat plate shape with a rectangular planar shape, that is, a thin rectangular parallelepiped shape. One end face of the bridge plate 15 is abutted against the inner face 11$i$ of the corresponding peripheral portion 11$e$ of the first supporting plate 11 and is joined to the peripheral portion 11$e$ by electron beam welding or laser welding that is performed from the radially outer side of the first supporting plate 11. The other end face of the bridge plate 15 is abutted against the inner face 12$i$ of the corresponding peripheral portion 12$e$ of the second supporting plate 12 and is joined to the peripheral portion 12$e$ by electron beam welding or laser welding that is performed from the radially outer side of the second supporting plate 12. As illustrated in FIG. 2, the bridge plate 15 is joined to the first and second supporting plates 11, 12 so as to be positioned radially inward (on the circular holes 11$o$, 12$o$ side, that is, on the axis of the planetary carrier 10 side) relative to an addendum circle Ct of a ring gear that is to be meshed with the pinion gears PG. In the embodiment, the bridge plate 15 is joined to the first and second supporting plates 11, 12 so that an outer face is flush with the side faces of the peripheral portions 11$e$, 12$e$. However, the bridge plate 15 may be joined to the first and second supporting plates 11, 12 so that the outer face is positioned radially inward relative to the side faces of the peripheral portions 11$e$, 12$e$.

In this way, an end of each bridge plate 15 is joined to the first supporting plate 11 via a welding portion WP and the other end of the bridge plate 15 is joined to the second supporting plate 12 via the welding portion WP. The first supporting plate 11 and the second supporting plate 12 are thus firmly connected by a plurality of the bridge plates 15. After the first and second supporting plates 11, 12 and the bridge plates 15 are assembled, the pinion gears PG are disposed in order between the first and second supporting plates 11, 12 from between side faces of the adjacent bridge plates 15. The pinion shafts PS are inserted in order in the shaft holes 11h, 12h of the first and second supporting plates 11, 12 and the pinion gears PG. Both ends of the pinion shafts PS are then clinched. In this way, the pinion gears PG are supported by the first and second supporting plates 11, 12 so as to be rotatable, and the planetary carrier 10 is thus completed. A sun gear not shown that meshes with the pinion gears PG is disposed between the first and second supporting plates 11, 12 via the circular hole 11o or the circular hole 12o. A shaft (not shown) that is fixed to the sun gear extends through at least one of the circular hole 11o and the circular hole 12o.

As described above, in the planetary carrier 10, the one end of each bridge plate 15 is welded to the first supporting plate 11 and the other end is welded to the second supporting plate 12. The first supporting plate 11 and the second supporting plate 12 are thus connected by the bridge plates 15. The strength of the planetary carrier 10 can therefore be satisfactorily ensured. Each bridge plate 15 is welded to the corresponding peripheral portions 11e, 12e of the first and second supporting plates 11, 12. When a shear force in the rotational direction acts on the planetary carrier 10, a component force of the shear force acts on each welding portion WP and the shear force acting on the welding portion WP is thus smaller than the shear force in the rotational direction. It is therefore possible to further improve the strength of the planetary carrier 10 against the shear force in the rotational direction.

Figure 3A:
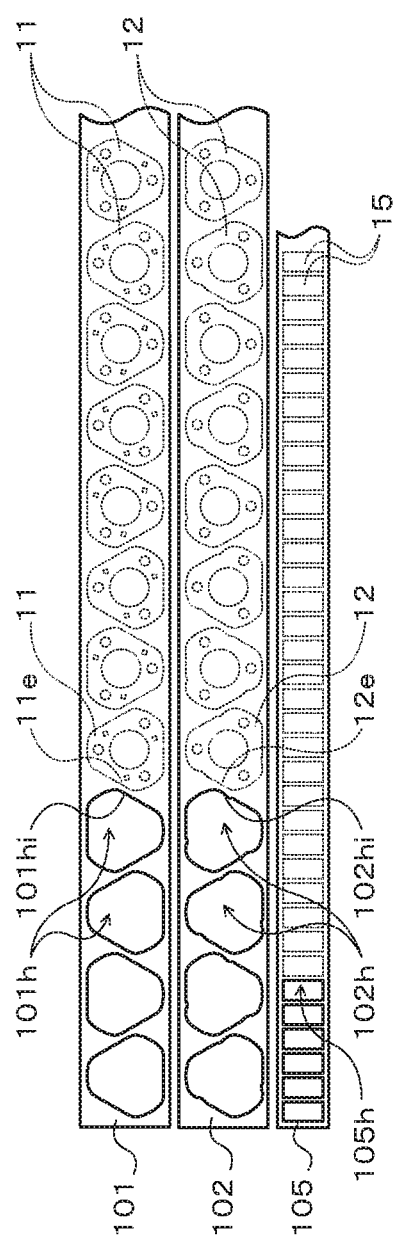
FIG. 3A is an explanatory diagram of a base material of a constituent member of the planetary carrier of the disclosure.
Figure 3B:
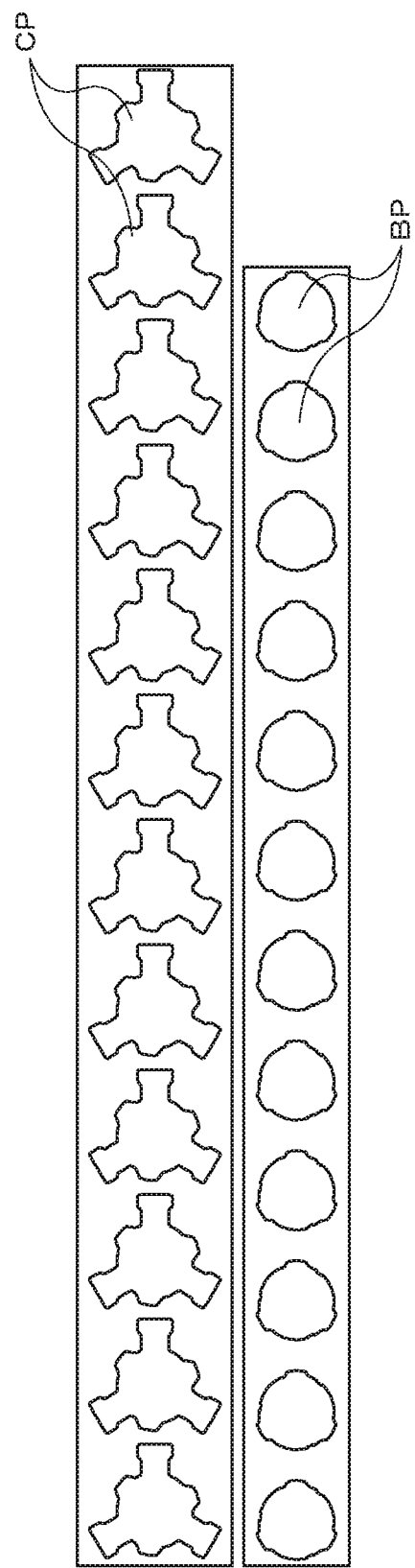
FIG. 3B is an explanatory diagram of a base material of a constituent member of a conventional planetary carrier.

In the planetary carrier 10, the planar shape of the first and second supporting plates 11, 12 and the bridge plate 15 can be simplified as described above. More specifically, the first and second supporting plates 11, 12 have a simple planar shape with a generally equilateral triangle shape (polygonal shape), and each bridge plate 15 has an extremely simple rectangular planar shape. As illustrated in FIG. 3A, it is possible to set the size (surface area) of plate materials 101, 102, 105 to be significantly smaller than the size of base materials (plate materials) that are needed for manufacturing a prescribed number of planetary carriers including a carrier plate CP having a plurality of leg portions and a base plate BP (see FIG. 3B). Here, the plate materials 101, 102, 105 are base materials of the first and second supporting plates 11, 12 and the bridge plates 15 that are needed for manufacturing a prescribed number of planetary carriers 10.

That is, the first and second supporting plates 11, 12 are blanked from the plate material 101 or the plate material 102 by a punch or a die not shown. As it can be seen from FIG. 3A, the first and second supporting plates 11, 12 are blanked so that one of the peripheral portions 11e, 12e extends in parallel with inner faces 101hi, 102hi, corresponding to one of the peripheral portions 11e, 12e, of blanked holes 101h, 102h. Here, the blanked holes 101h, 102h are formed in the plate materials 101, 102 by blanking of the first or second supporting plates 11, 12 that has been performed one shot before. The bridge plates 15 are blanked from a plate material 105 by a punch or a die not shown. As it can be seen from FIG. 3A, each bridge plate 15 is blanked so that one of the peripheral portions extends in parallel with an inner face, corresponding to one of the peripheral portions, of a blanked hole 105h. Here, the blanked hole 105h is formed in the plate material 105 by blanking of the bridge plate 15 that has been performed one shot before. Compared to the carrier plate CP and the base plate BP, it is thus possible to significantly narrow the intervals (the widths of feed bridges) between the blanked holes 101h, 102h, 105h in the plate materials 101, 102, 105 that are base materials. It is therefore possible to significantly decrease the amount of end materials.

As a result, in the planetary carrier 10, it is possible to decrease the size of the base materials of the first and second supporting plates 11, 12 and the bridge plates 15 and improve material yield so as to significantly decrease the material cost. When welding the carrier plate CP having three leg portions to the base plate BP, there are three spots to weld. In contrast, when welding three bridge plates 15 to the first and second supporting plates 11, 12, there are six spots to weld. However, a decrease amount of the material cost of the planetary carrier 10 is sufficiently larger than an increase amount of the working cost resulting from the increase in the number of spots to weld. As a result, with the planetary carrier 10, it is possible to satisfactorily ensure the strength thereof and reduce the manufacturing cost extremely satisfactorily.

The first supporting plate 11, the second supporting plate 12, and the bridge plate 15 are each formed in separate steps. The material and the thickness etc. of the first supporting plate 11, the second supporting plate 12, and the bridge plate 15 can thus be made different from each other. The first supporting plate 11, the second supporting plate 12, and the bridge plate 15 may be blanked one by one from the plate materials 101, 102 or 105, or may be blanked in numbers (for example, in two).

In the embodiment described above, each bridge plate 15 is joined to the inner face 11i of the corresponding peripheral portion 11e of the first supporting plate 11 and the inner face 12i of the corresponding peripheral portion 12e of the second supporting plate 12 via the welding portions WP. It is thus possible to reduce the height of the bridge plate 15 so as to further reduce the material cost. When the bridge plate 15 is disposed between the inner face 11i of the first supporting plate 11 and the inner face 12i of the second supporting plate 12 in this way, both end faces of the bridge plate 15 are cut after blanking (press working) so as to ensure accuracy of the height of the bridge plate 15. At this time, the bridge plate 15 is formed to have a thin rectangular parallelepiped shape. Thus, all the end faces of the bridge plates 15 on one side can be cut at once and all the end faces of the bridge plates 15 on the other side can be cut at once. The cost required for cutting is significantly lower than the cost required for cutting the end portion of the leg portion of the carrier plate CP and the inner peripheral surface of the arcuate hole of the base plate BP described above to ensure assembly accuracy. In the planetary carrier 10, it is possible to reduce the cost required for cutting (machining cost) compared to the planetary carrier including the carrier plate CP and the base plate BP described above. The manufacturing cost can therefore be reduced.

In the embodiment described above, the number of peripheral portions 11e, 12e of the first and second supporting plates 11, 12 are set to be the same as the number of bridge plates 15. It is thus possible to simplify the planar shape of the first and second supporting plates 11, 12. The number of peripheral portions 11e, 12e of the first and second supporting plates 11, 12 is set to be the same as the number of pinion gears PG. It is thus possible to further simplify the planar shape of the first and second supporting plates 11, 12. However, as long as the planar shape is not complicated, the number of peripheral portions 11e, 12e of the first and second supporting plates 11, 12 may be more than the number of bridge plates 15 and may be different from the number of pinion gears PG.

In the embodiment described above, the first and second supporting plates 11, 12 are formed so that each peripheral portion 11e, 12e (side face) is positioned radially inward relative to the corresponding peripheral portion of the polygon (triangle) PI that is circumscribed to the pinion gears PG when the planetary carrier 10 is viewed in plan. In this way, it is possible to ensure the strength of the planetary carrier 10, make the first and second supporting plates 11, 12 more compact so as to reduce the material cost, and reduce the weight of the planetary carrier 10. However, the first and second supporting plates 11, 12 may be formed so that the side face of each peripheral portion 11e, 12e overlaps with the corresponding peripheral portion of the polygon PI described above.

In the embodiment described above, each bridge plate 15 is joined to the first and second supporting plates 11, 12 so as to be disposed radially inward relative to the addendum circle Ct of the ring gear that is to be meshed with the pinion gears PG. In this way, it is possible to eliminate interference of the bridge plates 15 with the ring gear that is meshed with the pinion gears PG.

In the embodiment described above, the first and second supporting plates 11, 12 have the same configuration. In this way, management and handling of the members when the planetary carrier 10 is manufactured etc. can be made easier. It is thus possible to further reduce the manufacturing cost of the planetary carrier 10. However, the first and second supporting plates 11, 12 only need to have the same planar shape, and does not need to have a completely identical configuration. For example, the position of the clinching groove etc. may differ in the first and second supporting plates 11, 12.

Figure 4:
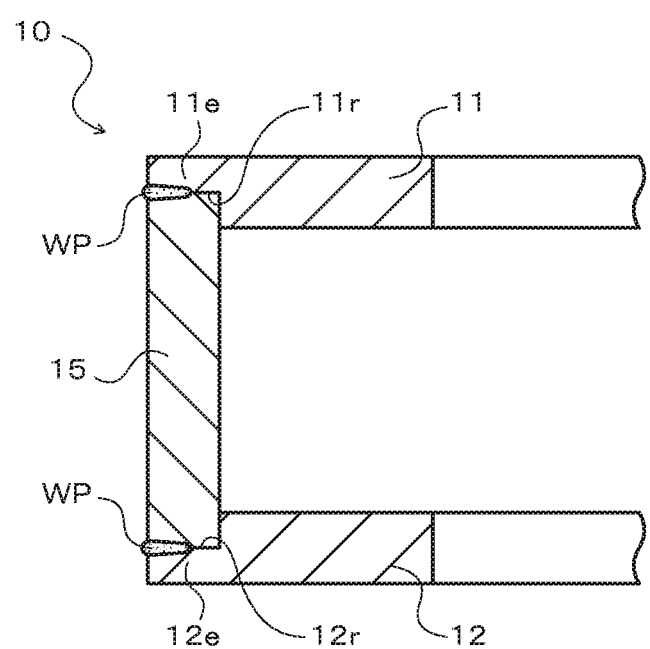
FIG. 4 is an enlarged sectional view of an example of a joining portion of first and second supporting plates and a bridge plate.

In the peripheral portion 11e, 12e of the first and second supporting plates 11, 12 of the planetary carrier 10, recessed portions 11r, 12r to which one end or the other end of the bridge plate 15 is fitted may be formed, as illustrated in FIG. 4. In this case, the one end of the bridge plate 15 is joined to an inner face of the recessed portion 11r of the corresponding peripheral portion 11e via the welding portion WP and the other end of the bridge plate 15 is joined to an inner face of the recessed portion 12r of the corresponding peripheral portion 12e via the welding portion WP. In this way, it is possible to easily and accurately position the bridge plate 15 with respect to the first and second supporting plates 11, 12 when performing welding operation.

Figure 5:
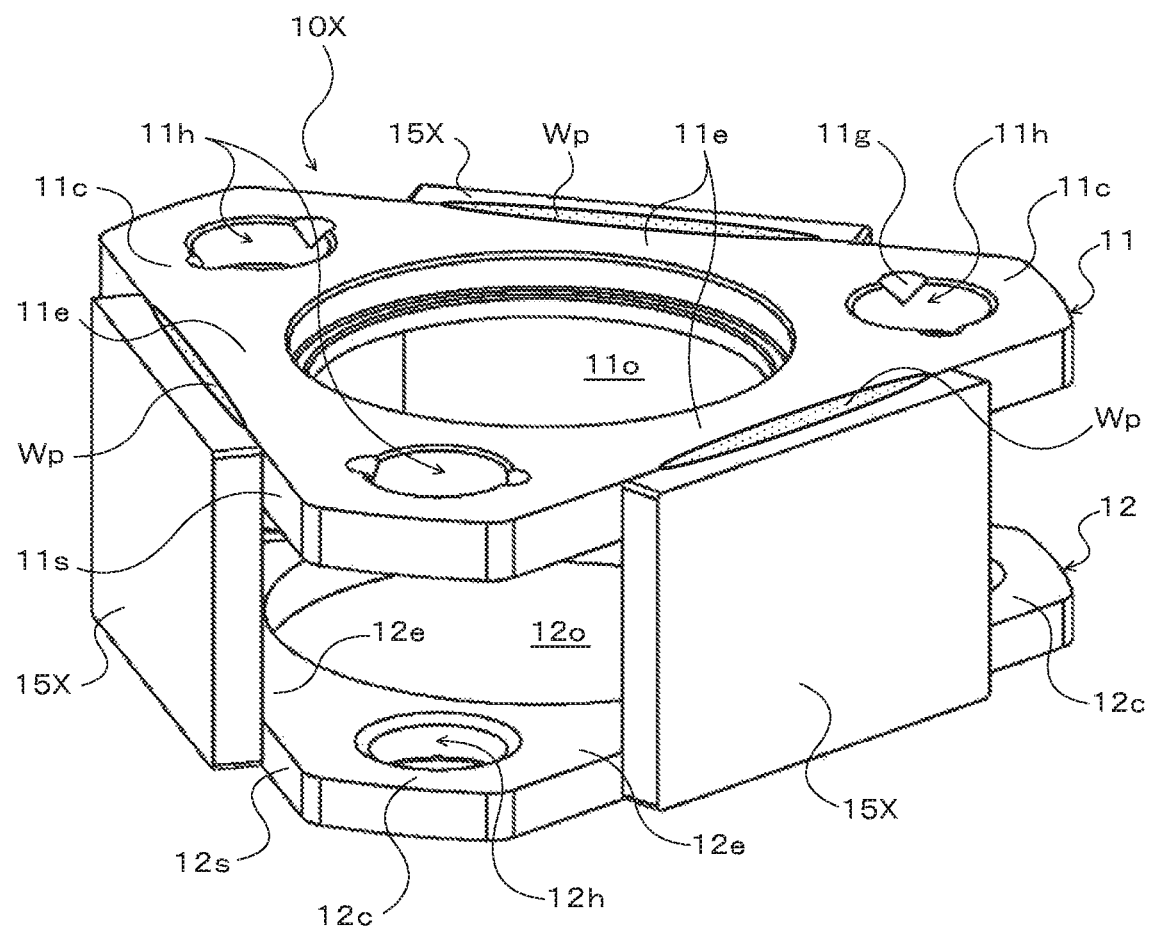
FIG. 5 is a perspective view of another planetary carrier of the disclosure.
Figure 6:
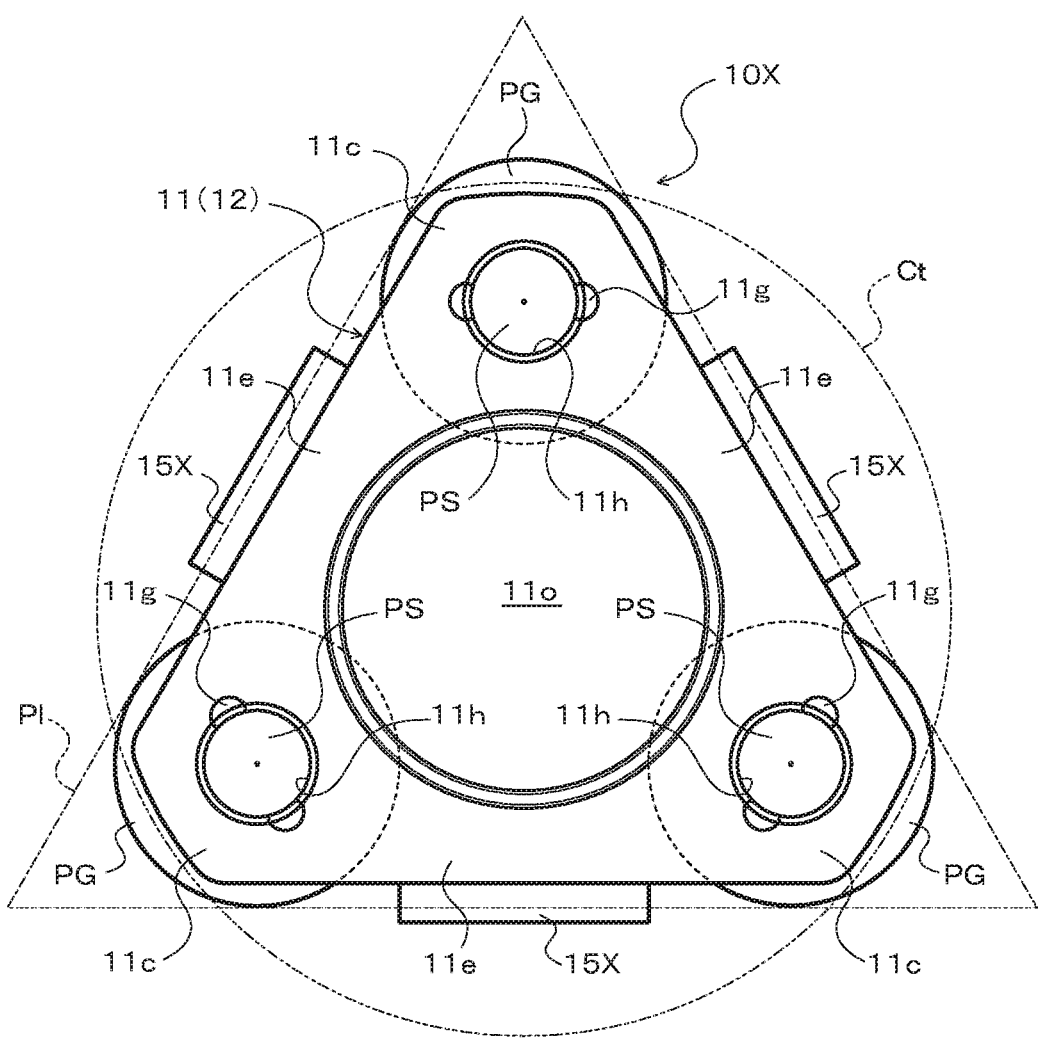
FIG. 6 is a plan view of the planetary carrier illustrated in FIG. 5.

FIG. 5 is a perspective view of another planetary carrier 10X of the disclosure. FIG. 6 is a plan view of the planetary carrier 10X. Among the components of the planetary carrier 10X, the components that are the same as those of the planetary carrier 10 described above are given the same reference signs and description thereof will be omitted.

The planetary carrier 10X illustrated in FIGS. 5 and 6 is included in a single-pinion type planetary gear that is applied to a transmission. The planetary carrier 10X includes a plurality of (three in the embodiment, for example) pinion gears PG and a plurality of (three in the embodiment, for example) pinion shafts PS that are each inserted in the corresponding pinion gear PG (in FIG. 5, both are not shown). The planetary carrier 10X also includes the first supporting plate 11 that supports the one end of each pinion shaft PS, the second supporting plate 12 that supports the other end of each pinion shaft PS, and a plurality of (three in the embodiment, for example) bridge plates 15X that connect the first and second supporting plates 11, 12. The bridge plates 15X are formed by blanking (press working) that is similar to the operation performed on the bridge plates 15 described above.

In the planetary carrier 10X, one end of each bridge plate 15X is abutted against a side face 11s (see FIG. 5) of the corresponding peripheral portion 11e of the first supporting plate 11 and is joined to the peripheral portion 11e by electron beam welding or laser welding that is performed from the axially outer side of the first supporting plate 11. The other end of each bridge plate 15X is abutted against a side face 12s of the corresponding peripheral portion 12e of the second supporting plate 12 and is joined to the peripheral portion 12e by electron beam welding or laser welding that is performed from the axially outer side of the second supporting plate 12. As illustrated in FIG. 6, the bridge plate 15X is joined to the first and second supporting plates 11, 12 so as to be positioned radially inward (on the circular holes 11o, 12o side, that is, on the axis side of the planetary carrier 10X) relative to the addendum circle Ct of the ring gear that is to be meshed with the pinion gears PG.

In this way, in the planetary carrier 10X, each bridge plate 15X is joined to the side face 11s of the corresponding peripheral portion 11e of the first supporting plate 11 and the side face 12s of the corresponding peripheral portion 12e of the second supporting plate 12 via the welding portions WP. Similar to the planetary carrier including the carrier plate CP having the leg portions and the base plate BP, the bridge plate 15X can be welded to the corresponding peripheral portions 11e, 12e from the axial direction of the planetary carrier 10X. Welding operation can be performed using existing welding equipment or modified welding equipment.

Figure 7:
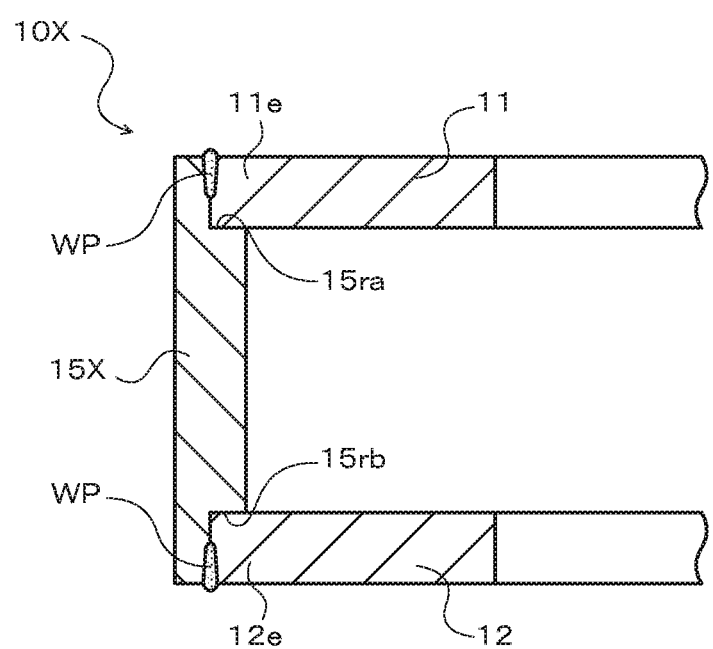
FIG. 7 is an enlarged sectional view of another example of the joining portion of the first and second supporting plates and the bridge plate.

In each bridge plate 15X of the planetary carrier 10X, a recessed portion 15ra to which the peripheral portion 11e of the first supporting plate 11 is fitted and a recessed portion 15rb to which the peripheral portion 12e of the second supporting plate 12 is fitted may be formed, as illustrated in FIG. 7. In this case, the one end of the bridge plate 15X is joined to the side face of the peripheral portion 11e that is fitted to the recessed portion 15ra via the welding portion WP and the other end of the bridge plate 15X is joined to the peripheral portion 12e that is fitted to the recessed portion 15rb via the welding portion WP. It is thus possible to easily and accurately position the bridge plate 15X with respect to the first and second supporting plates 11, 12 when performing welding operation. It is therefore possible to dispense with a jig for adjusting intervals of the first and second supporting plates 11, 12 when the bridge plate 15X is welded.

Figure 8:
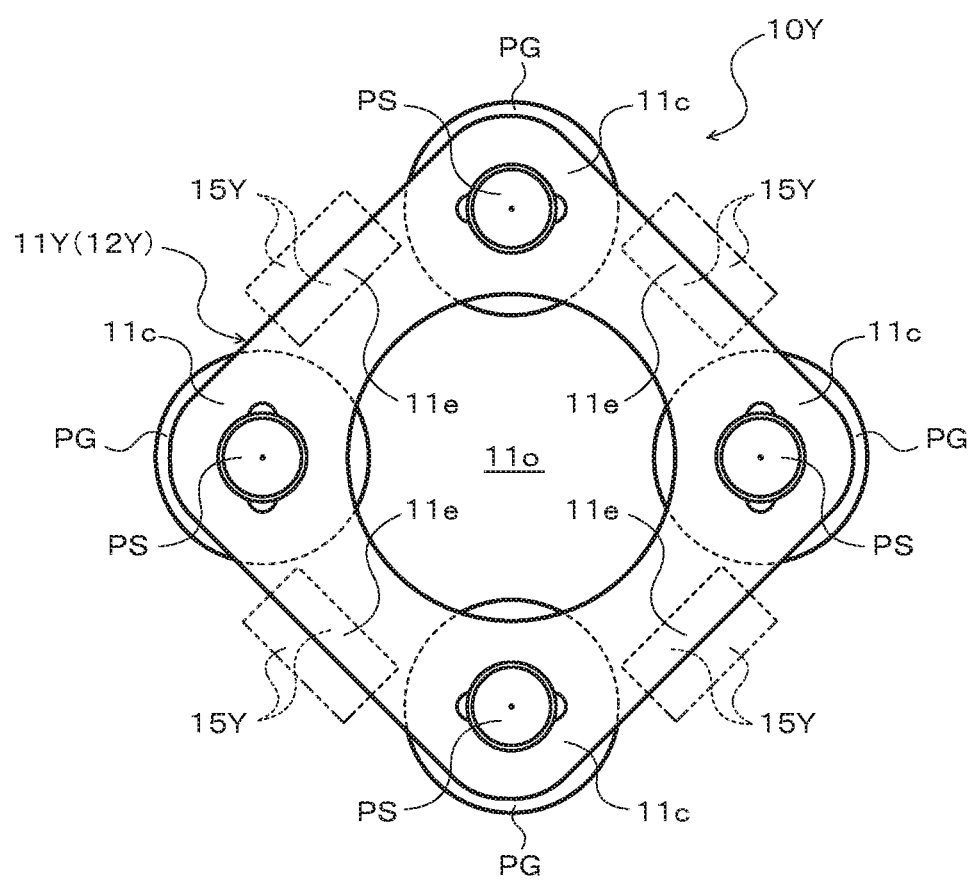
FIG. 8 is a plan view of still another planetary carrier of the disclosure.

The planetary carriers 10, 10X described above are included in a single-pinion type planetary gear and both have three pinion gears PG. However, the number of pinion gears PG in the planetary carriers 10, 10X may be two, four, or more than four. FIG. 8 illustrates a planetary carrier 10Y for a single-pinion type planetary gear, in which the planetary carrier 10Y has four pinion gears PG. As illustrated, the planetary carrier 10Y includes one first supporting plate 11Y that supports the one end of each pinion shaft PS, one second supporting plate 12Y that supports the other end of each pinion shaft PS, and four bridge plates 15Y that connect the first and second supporting plates 11Y, 12Y. The first supporting plate 11Y is formed by blanking (press working) that is similar to the operation performed on the first supporting plate 11 described above. The second supporting plate 12Y is formed by blanking (press working) that is similar to the operation performed on the second supporting plate 12 described above. The bridge plate 15Y is formed by blanking (press working) that is similar to the operation performed on the bridge plate 15 described above.

The first supporting plate 11Y of the planetary carrier 10Y has a flat outer face and a flat inner face, the circular hole (through hole) 11o that extends concentrically with the axis of the planetary carrier 10Y, four peripheral portions 11e that each extend linearly around the circular hole 11o, and four corner portions 11c that connect the adjacent peripheral portions 11e to each other. The second supporting plate 12Y of the planetary carrier 10Y has the same configuration (planar shape) as that of the first supporting plate 11Y. The second supporting plate 12Y thus has a flat outer face and a flat inner face, the circular hole (through hole) that extends concentrically with the axis of the planetary carrier 10Y, four peripheral portions that each extend linearly around the circular hole, and four corner portions that connect the adjacent peripheral portions to each other (all not shown).

In the planetary carrier 10Y, the first and second supporting plates 11Y, 12Y are formed so that each peripheral portion is positioned radially inward relative to the corresponding peripheral portion of the polygon (square) that is circumscribed to the pinion gears PG when the planetary carrier 10Y is viewed in plan. Each bridge plate 15Y is joined to the first and second supporting plates 11Y, 12Y so as to be disposed radially inward relative to the addendum circle of the ring gear that is to be meshed with the pinion gears PG.

As illustrated in FIG. 8 by a broken line, each bridge plate 15Y is welded to the inner face of the corresponding peripheral portion 11e of the first supporting plate 11Y and the inner face of the corresponding peripheral portion of the second supporting plate 12Y. However, as illustrated in FIG. 8 by a long dashed double-short dashed line, the bridge plate 15Y may be welded to the peripheral portion 11e of the corresponding peripheral portion 11e of the first supporting plate 11Y and the side face of the corresponding peripheral portion of the second supporting plate 12Y. The number of first and second supporting plates 11Y, 12Y may be more than the number of bridge plates 15Y or may be different from the number of pinion gears PG, as long as the planar shape is not complicated. On one of the bridge plate 15Y and the peripheral portions of the first and second supporting plates 11Y, 12Y, a recessed portion to which the other of the bridge plate 15Y and the peripheral portion of the first and second supporting plates 11Y, 12Y is fitted may be formed.

Figure 9:
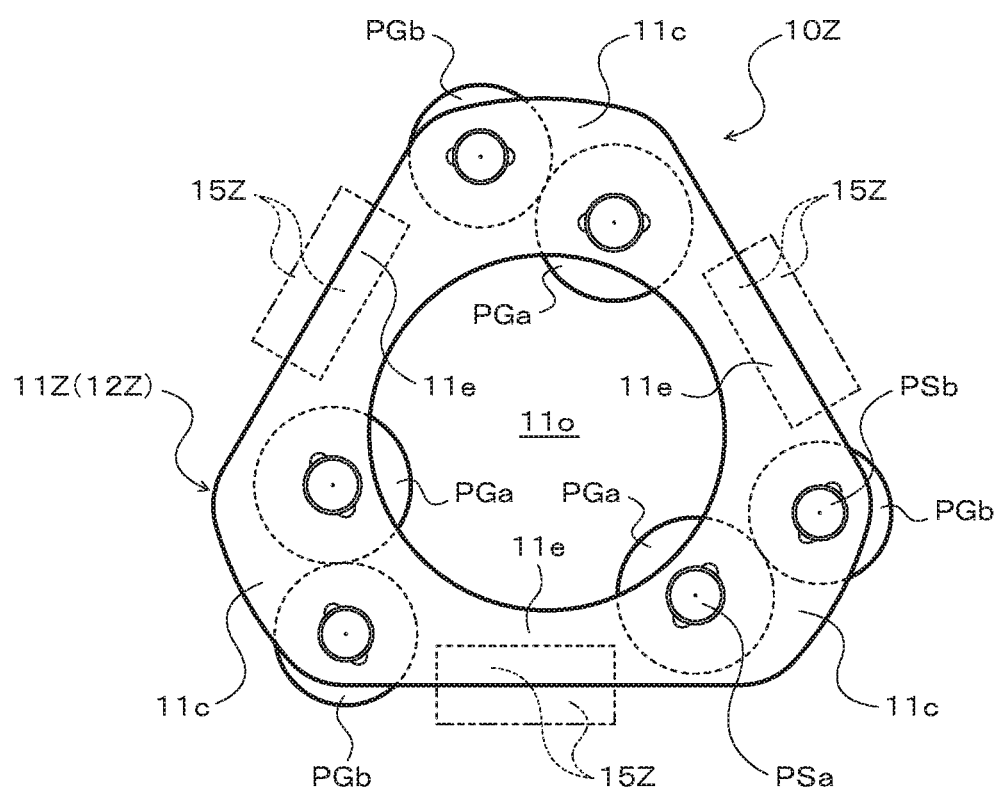
FIG. 9 is a plan view of another planetary carrier of the disclosure.

The planetary carriers 10, 10X and 10Y described above are included in a single-pinion type planetary gear. However, the planetary carrier of the disclosure may be included in a double-pinion type planetary gear. FIG. 9 illustrates a planetary carrier 10Z for a double-pinion type planetary gear. The planetary carrier 10Z illustrated in FIG. 9 has three pairs of a first pinion gear PGa and a second pinion gear PGb. Here, the first pinion gear PGa is meshed with a sun gear not shown and the second pinion gear PGb is meshed with the first pinion gear PGa and the sun gear not shown.

As illustrated in FIG. 9, the planetary carrier 10Z includes one first supporting plate 11Z, one second supporting plate 12Z, and three bridge plates 15Z. The first supporting plate 11Z supports one end of the pinion shaft PSa that is inserted in each first pinion gear PGa and supports one end of the pinion shaft PSb that is inserted in each second pinion gear PGb. The second supporting plate 12Z supports the other end of the pinion shaft PSa that is inserted in each first pinion gear PGa and supports the other end of the pinion shaft PSb that is inserted in each second pinion gear PGb. The bridge plates 15Z connect the first and second supporting plates 11Z, 12Z. The first supporting plate 11Z is formed by blanking (press working), similar to the first supporting plate 11 described above. The second supporting plate 12Z is formed by blanking (press working) that is similar to the operation performed on the second supporting plate 12 described above. The bridge plate 15Z is formed by blanking (press working) that is similar to the operation performed on the bridge plate 15 described above.

The first supporting plate 11Z of the planetary carrier 10Z has a flat outer face and a flat inner face, the circular hole (through hole) 11o that extends concentrically with the axis of the planetary carrier 10Z, three peripheral portions 11e that each extend linearly around the circular hole 11o, and three corner portions 11c that connect the adjacent peripheral portions 11e to each other. The second supporting plate 12Z of the planetary carrier 10Z has the same configuration (planar shape) as that of the first supporting plate 11Z. The second supporting plate 12Z thus has a flat outer face and a flat inner face, the circular hole (through hole) that extends concentrically with the axis of the planetary carrier 10Z, three peripheral portions that each extend linearly around the circular hole, and three corner portions that connect the adjacent peripheral portions to each other (all not shown). That is, the first and second supporting plates 11Z, 12Z have the same number of peripheral portions as the number of pairs of the first and second supporting gears PGa, PGb that mesh with each other.

In the planetary carrier 10Z, the first and second supporting plates 11Z, 12Z are formed so as to be positioned radially inward relative to the corresponding peripheral portion of the polygon (square) that is circumscribed to the pinion gears PG when the planetary carrier 10Z is viewed in plan. Each bridge plate 15Z is joined to the first and second supporting plates 11Z, 12Z so as to be disposed radially inward relative to the addendum circle of the ring gear that is to be meshed with the pinion gears PG. As illustrated in FIG. 9 by a broken line, the bridge plate 15Z is welded to the inner face of the corresponding peripheral portion 11e of the first supporting plate 11Z and the inner face of the corresponding peripheral portion of the second supporting plate 12Z. However, as illustrated in FIG. 9 by a long dashed double-short dashed line, the bridge plate 15Z may be welded to the side face of the corresponding peripheral portion 11e of the first supporting plate 11Z and the side face of the corresponding peripheral portion of the second supporting plate 12Z. The number of peripheral portions of the first and second supporting plates 11Z, 12Z may be more than the number of bridge plates 15Z or may be different from the number of pairs of the first and second pinion gears PGa, PGb, as long as the planar shape is not complicated. On one of the bridge plate 15Z and the peripheral portions of the first and second supporting plates 11Z, 12Z, a recessed portion to which the other one of the bridge plate 15Z and the peripheral portions of the first and second supporting plates 11Z, 12Z is fitted may be formed.

The transmission to which the planetary gear including the planetary carriers 10, 10X, 10Y, 10Z described above is applied may be a stepped transmission, a mechanical continuously variable transmission (forward-reverse switching mechanism), or a hybrid transmission. In any case, with the planetary carriers 10, 10X, 10Y, 10Z described above, it is possible to satisfactorily reduce the manufacturing cost of the planetary gear including the planetary carriers 10, 10X, 10Y, 10Z and hence reduce the manufacturing cost of the transmission including the planetary gear. However, the planetary carriers 10, 10X, 10Y, 10Z described above may be included in a planetary gear that is applied to a device besides a transmission.

Figure 10:
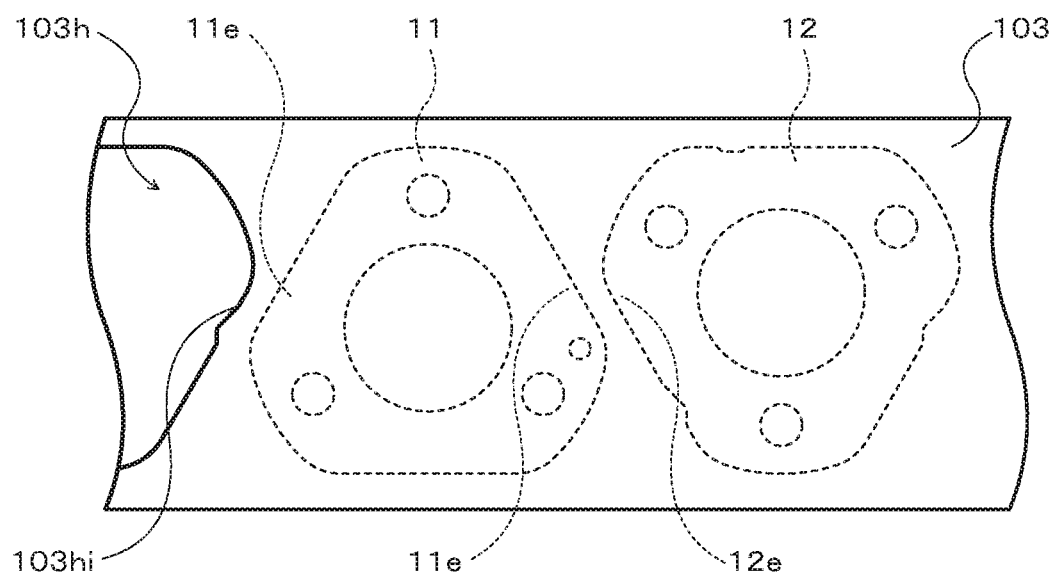
FIG. 10 is an explanatory diagram for another manufacturing procedure of the planetary carrier of the disclosure.

FIG. 10 is an explanatory diagram for another manufacturing procedure of the planetary carrier 10 etc., that is, another forming procedure of the first and second supporting plates 11, 12. In the example illustrated in FIG. 10, the first supporting plate 11 and the second supporting plate 12 are formed from a common plate material 103 in the same step. In this way, it is possible to reduce the number of die sets etc. and reduce the cost of the manufacturing facility of the planetary carrier 10 etc. In the example illustrated in FIG. 10, the first and second supporting plates 11, 12 are blanked from the plate material 103 by a punch or a die not shown. The first and second supporting plates 11, 12 are blanked so that one of the peripheral portions 11e, 12e extends in parallel with an inner face 103hi, corresponding to one of the peripheral portions 11e, 12e, of a blanked hole 103h. Here, the blanked hole 103h is formed in the plate material 103 by blanking of the first and second supporting plates 11, 12 that has been performed one shot before. It is thus possible to significantly narrow the interval (the width of a feed bridge) between the blanked holes 103h in the plate material 103 that is the base material. It is therefore possible to significantly decrease the amount of end materials. In the example illustrated in FIG. 10, the first and second supporting plates 11, 12 are blanked at once (one for each supporting plate) from the plate material 103 by a punch or a die not shown. Here, the first and second supporting plates 11, 12 are arranged to be adjacent to each other so that the corresponding peripheral portions 11e, 12e extend in parallel with each other. In this way, it is possible to effectively manufacture the first and second supporting plates 11, 12. However, the first supporting plate 11 and the second supporting plate 12 may be blanked from the plate material 103 one plate at a time sequentially. The manufacturing procedure illustrated in FIG. 10 may be applied when manufacturing the first and second supporting plates 11Y, 12Y and the first and second supporting plates 11Z, 12Z.

Figure 11:
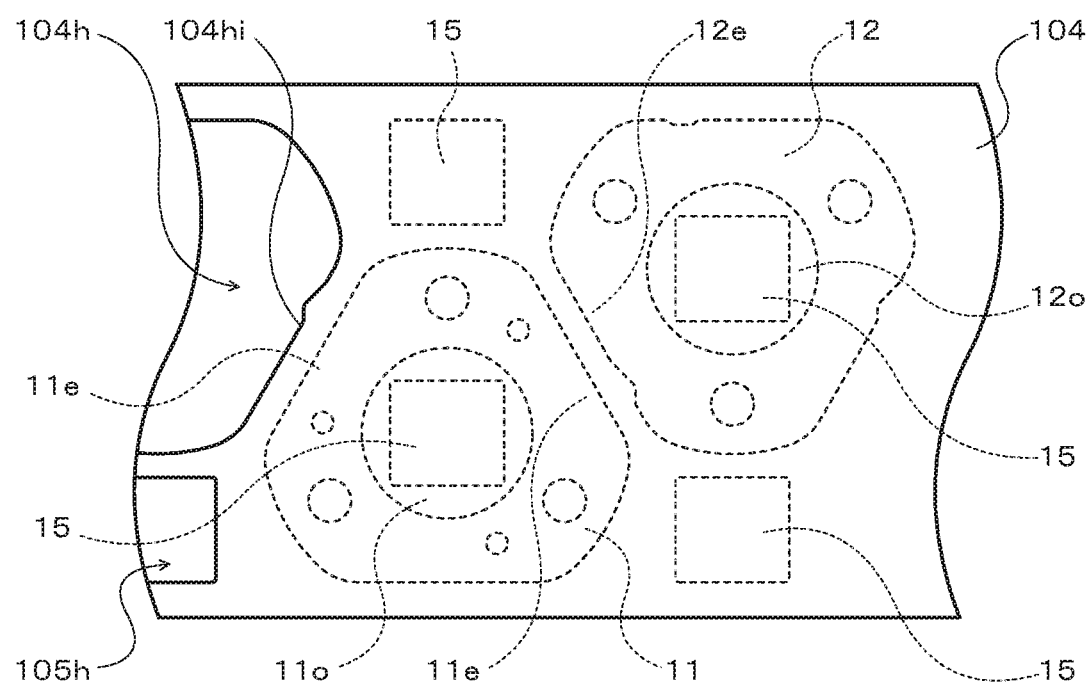
FIG. 11 is an explanatory diagram for still another manufacturing procedure of the planetary carrier of the disclosure.

FIG. 11 is an explanatory diagram for another manufacturing procedure of the planetary carrier 10 etc., that is, still another forming procedure of the first and second supporting plates 11, 12. In the example illustrated in FIG. 11, the first supporting plate 11, the second supporting plate 12, and the bridge plate 15 are blanked from a common plate material 104. In this way, it is possible to reduce the number of die sets etc. and reduce the cost of the manufacturing facility of the planetary carrier 10 etc. In the example illustrated in FIG. 11, the first and second supporting plates 11, 12 are blanked from the plate material 104 by a punch or a die not shown. The first and second supporting plates 11, 12 are blanked so that one of the peripheral portions 11e, 12e extends in parallel with an inner face 104hi, corresponding to one of the peripheral portions 11e, 12e, of a blanked hole 104h. Here, the blanked hole 104h is formed in the plate material 104 by blanking of the first and second supporting plates 11, 12 that has been performed one shot before. It is thus possible to significantly narrow the interval (the width of a feed bridge) between the blanked holes 104h in the plate material 104 that is the base material. It is therefore possible to significantly decrease the amount of end materials. The bridge plate 15 is blanked from parts of the plate material 104 that correspond to the circular hole (first through hole) 11o and the circular hole (second through hole) 12o and the periphery of parts of the plate material 104 that correspond to the first supporting plate 11 and the second supporting plate 12. In this way, it is possible to further narrow each interval between the blanked hole 104h in the plate material 104 and a blanked hole 105h formed in the plate material 104 by blanking the bridge plate 15 so as to further reduce the amount of end material. It is also possible to reduce the number of die sets etc. and reduce the cost of a manufacturing facility of the planetary carrier 10 etc. The bridge plate 15 may be blanked from the plate material 104 before the first and second supporting plates 11, 12 are blanked. At least one of the first and second supporting plates 11, 12 and a prescribed number of bridge plates 15 around thereof may be blanked at once from the plate material 104. The manufacturing procedure illustrated in FIG. 11 may be applied when manufacturing the first and second supporting plates 11Y, 12Y and the first and second supporting plates 11Z, 12Z.

As described above, the planetary carrier of the disclosure is a planetary carrier (10, 10X, 10Y, 10Z) including a plurality of pinion gears (PG, PGa, PGb) and a plurality of pinion shafts (PS, PSa, PSb) that are each inserted in the corresponding pinion gear (PG, PGa, PGb). The planetary carrier (10, 10X, 10Y, 10Z) includes a first supporting plate (11, 11Y, 11Z) that supports one end of each of the pinion shafts (PS, PSa, PSb), a second supporting plate (12, 12Y, 12Z) that supports the other end of each of the pinion shafts (PS, PSa, PSb), and a plurality of bridge plates (15, 15X, 15Y, 15Z), one end of each of which is joined to the first supporting plate (11, 11Y, 11Z) via a welding portion (WP) and the other end of each of which is joined to the second supporting plate (12, 12Y, 12Z) via a welding portion (WP) and which connects the first and second supporting plates (11, 11Y, 11Z, 12, 12Y, 12Z).

In the planetary carrier of the disclosure, the one end of each bridge plate is joined to the first supporting plate via the welding portion and the other end is joined to the second supporting plate via the welding portion and thus, the first and second supporting plates are connected by the bridge plates. The strength of the planetary carrier can therefore be satisfactorily ensured. In the planetary carrier, the planar shape of the first and second supporting plates and the bridge plate can be simplified. In this way, it is possible to decrease the size of the base materials of the first and second supporting plates and the bridge plate and improve material yield so as to decrease the material cost. A decrease amount of the material cost is sufficiently larger than an increase amount of the working cost resulting from the increase in the number of spots to weld. As a result, it is possible to satisfactorily ensure the strength of the planetary carrier of the disclosure and satisfactorily reduce the manufacturing cost.

The first and second supporting plates (11, 11Y, 11Z, 12, 12Y, 12Z) may each include a plurality of peripheral portions (11e, 12e) that extend linearly and a plurality of corner portions (11c, 12c) that connect the adjacent peripheral portions (11e, 12e) with each other. Each bridge plate (15, 15X, 15Y, 15Z) may have a rectangular planar shape and may be joined to the corresponding peripheral portion (11e, 12e) of the first and second supporting plates (11, 11Y, 11Z, 12, 12Y, 12Z) via the welding portions (WP). Such first and second supporting plates that have a polygonal shape and a bridge plate that has a planar shape are adopted. It is thus possible to further decrease the size of the base materials of the first and second supporting plates and the bridge plate and further improve material yield. As a result, it is possible to significantly reduce the manufacturing cost of the planetary carrier. In addition, the bridge plate is welded to each peripheral portion of the first and second supporting plates and thus, the strength of the planetary carrier against the shear force in the rotational direction of the planetary carrier can be further improved.

The first and second supporting plates (11, 11Y, 11Z, 12, 12Y, 12Z) may include the same number of peripheral portions (11e, 12e) as that of the bridge plates (15, 15X, 15Y, 15Z). In this way, it is possible to further simplify the planar shape of the first and second supporting plates.

The first supporting plate and the second supporting plate (11, 11Y, 11Z, 12, 12Y, 12Z) may have the same planar shape as each other. In this way, management and handling of the members can be made easier. It is thus possible to further reduce the manufacturing cost of the planetary carrier.

The first and second supporting plates (11, 11Y, 11Z, 12, 12Y, 12Z) may be formed so that each peripheral portion (11e, 12e) overlaps with a corresponding peripheral portion of a polygon (PI) that is circumscribed to the pinion gears (PG) or so that each peripheral portion (11e, 12e) of the first and second supporting plates (11, 11Y, 11Z, 12, 12Y, 12Z) is positioned radially inward relative to the peripheral portion of the polygon (PI). In this way, it is possible to ensure the strength of the planetary carrier, make the first and second supporting plates more compact so as to reduce material cost, and reduce the weight of the planetary carrier.

Each bridge plate (15, 15Y, 15Z) may be joined to an inner face (11i) of the corresponding peripheral portion (11e) of the first supporting plate (11, 11Y, 11Z) and an inner face (12i) of the corresponding peripheral portion (12e) of the second supporting plate (12, 12Y, 12Z) via the welding portions (WP). It is thus possible to reduce the height of the bridge plate so as to further reduce the material cost.

Each bridge plate (15X, 15Y, 15Z) may be joined to a side face (11s) of the corresponding peripheral portion (11e) of the first supporting plate (11, 11Y, 11Z) and a side face of the corresponding peripheral portion (12e) of the second supporting plate (12, 12Y, 12Z) via the welding portions (WP). It is thus possible to weld the bridge plate to the corresponding peripheral portion from the axial direction of the planetary carrier when performing welding operation by using existing welding equipment or modified welding equipment.

On one of the peripheral portion (11e, 12e) and the bridge plate (15, 15X, 15Y, 15Z), a recessed portion (11r, 12r, 15ram 15rb) to which the other one of the peripheral portion (11e, 12e) and the bridge plate (15, 15X, 15Y, 15Z) is fitted may be formed. In this way, it is possible to easily and accurately position the bridge plate with respect to the first and second supporting plates when performing welding operation.

Each bridge plate (15, 15X, 15Y, 15Z) may be joined to the first and second supporting plates (11, 11Y, 11Z, 12, 12Y, 12Z) so as to be disposed radially inward relative to an addendum circle (Ct) of a ring gear that is meshed with the pinion gears (PG, PGa, PGb). In this way, it is possible to eliminate interference of the bridge plates with the ring gear that is meshed with the pinion gears.

The planetary carrier (10, 10X, 10Y) may be included in a single-pinion type planetary gear, and the first and second supporting plates (11, 11Y, 11Z, 12, 12Y, 12Z) may include the same number of peripheral portions (11e, 12e) as that of the pinion gears (PG).

The planetary carrier (10Z) may be included in a double-pinion type planetary gear and the first and second supporting plates (11Z, 12Z) may include the same number of peripheral portions (11e, 12e) as that of pairs of the two pinion gears (PGa, PGb) that mesh with each other.

The planetary carrier (10, 10X, 10Y, 10Z) may be included in a planetary gear of a transmission. It is thus possible to satisfactorily reduce the manufacturing cost of the planetary gear including the planetary carrier and hence reduce the manufacturing cost of the transmission.

The manufacturing method of the planetary carrier of the disclosure is a manufacturing method of a planetary carrier (10, 10X, 10Y, 10Z). The planetary carrier (10, 10X, 10Y, 10Z) includes a plurality of pinion gears (PG, PGa, PGb) and a plurality of pinion shafts (PS, PSa, PSb) that are each inserted in the corresponding pinion gear (PG, PGa, PGb). The planetary carrier (10, 10X, 10Y, 10Z) also includes two supporting plates (11, 11Y, 11Z, 12, 12Y, 12Z) that each support a corresponding end portion of the pinion shafts (PS, PSa, PSb), and a plurality of bridge plates (15, 15X, 15Y, 15Z) that are each welded to the two supporting plates (11, 11Y, 11Z, 12, 12Y, 12Z) and that connect the two supporting plates (11, 11Y, 11Z, 12, 12Y, 12Z). The manufacturing method includes a blanking step of blanking the supporting plate (11, 11Y, 11Z, 12, 12Y, 12Z) from a plate material (101, 102, 103,104) so that the supporting plate includes a plurality of peripheral portions (11e, 12e) that are extended linearly. In the blanking step, the supporting plate (11, 11Y, 11Z, 12, 12Y, 12Z) is blanked from the plate material (101, 102, 103, 104) so that one of the peripheral portions (11e, 12e) extends in parallel with an inner face (101hi, 102hi, 103hi, 104hi), corresponding to one of the peripheral portions, of a blanked hole (101h, 102h, 103h, 104h). Here, the blanked hole (101h, 102h, 103h, 104h) is formed in the plate material (101, 102, 103, 104) by blanking of the supporting plate (11, 11Y, 11Z, 12, 12Y, 12Z) that has been performed one shot before.

With this method, it is possible to significantly narrow the interval between the blanked holes in the plate material. It is therefore possible to significantly decrease the amount of end materials. As a result, it is possible to manufacture a planetary carrier that has a high strength while improving material yield and significantly reducing the manufacturing cost.

The two supporting plates may include a first supporting plate (11, 11Y, 11Z) that supports one end of each of the pinion shafts (PS, PSa, PSb) and a second supporting plate (12, 12Y, 12Z) that supports the other end of each of the pinion shafts (PS, PSa, PSb). The first supporting plate (11, 11Y, 11Z), the second supporting plate (12, 12Y, 12Z), and the bridge plate (15, 15X, 15Y, 15Z) may each be formed in separate steps. The material and the thickness etc. of the first supporting plate, the second supporting plate, and the bridge plate can thus be made different from each other.

The two supporting plates may include a first supporting plate (11, 11Y, 11Z) that supports one end of each of the pinion shafts (PS, PSa, PSb), and a second supporting plate (12, 12Y, 12Z) that supports the other end of each of the pinion shafts (PS, PSa, PSb). The first supporting plate (11, 11Y, 11Z) and the second supporting plate (12, 12Y, 12Z) may be formed in the same step. In this way, it is possible to reduce the number of die sets etc. and reduce the cost of the manufacturing facility of the planetary carrier etc.

In the blanking step, the first and second supporting plates (11, 11Y, 11Z, 12, 12Y, 12Z) may be blanked at once from the plate material (103) while the first and second supporting plates (11, 11Y, 11Z, 12, 12Y, 12Z) are arranged to be adjacent to each other so that the corresponding peripheral portions (11e, 12e) extend in parallel with each other.

The two supporting plates may include a first supporting plate (11, 11Y, 11Z) that has a first through hole (11o) and that supports the one end of each of the pinion shafts (PS, PSa, PSb) and a second supporting plate (12, 12Y, 12Z) that has a second through hole (12o) and that supports the other end of each of the pinion shafts (PS, PSa, PSb). In the blanking step, the first and second supporting plates (11, 11Y, 11Z, 12, 12Y, 12Z) may be blanked from the plate material (104) and the bridge plate (15, 15X, 15Y, 15Z) may be blanked from a part of the plate material (104) that at least corresponds to the first through hole (11o) and the second through hole (12o). In this way, it is possible to further narrow the interval between the blanked holes in the plate material and further reduce the amount of end material. It is also possible to reduce the number of die sets etc. and further reduce the cost of the manufacturing facility for the planetary carrier.

It should be understood that the invention of the present disclosure is not limited in any way to the embodiments described above, and various modifications can be made within the spirit and scope of the disclosure. The above modes for carrying out the various aspects of the disclosure are merely shown as specific forms of the disclosure described in "SUMMARY OF THE DISCLOSURE" and are not intended to limit the elements of the invention described in "SUMMARY OF THE DISCLOSURE."

INDUSTRIAL APPLICABILITY

The various aspects of the disclosure are applicable to the manufacturing industry of planetary carriers, etc.

The invention claimed is:

1. A manufacturing method of a planetary carrier, the planetary carrier including a plurality of pinion gears, a plurality of pinion shafts that are each inserted in the corresponding pinion gear, two supporting plates that each support a corresponding end portion of the pinion shafts, and a plurality of bridge plates that are each welded to the two supporting plates and that connect the two supporting plates, wherein
   the manufacturing method includes a blanking step of blanking the supporting plate from a plate material so that the supporting plate includes a plurality of peripheral portions that are extended linearly, and in the blanking step, the supporting plate is blanked from the plate material so that one of the peripheral portions extends in parallel with an inner face, corresponding to one of the peripheral portions, of a blanked hole that is formed in the plate material by blanking of the supporting plate that has been performed one shot before.

2. The manufacturing method of a planetary carrier according to claim 1, wherein
   the two supporting plates include a first supporting plate that supports one end of each of the pinion shafts and a second supporting plate that supports the other end of each of the pinion shafts, and
   the first supporting plate, the second supporting plate, and the bridge plate are each formed in separate steps.

3. The manufacturing method of a planetary carrier according to claim 1, wherein
   the two supporting plates include a first supporting plate that supports one end of each of the pinion shafts and a second supporting plate that supports the other end of each of the pinion shafts, and
   the first supporting plate and the second supporting plate are formed in the same step.

4. The manufacturing method of a planetary carrier according to claim 3, wherein in the blanking step, the first and second supporting plates are blanked at once from the plate material while the first and second supporting plates are arranged to be adjacent to each other so that the corresponding peripheral portions extend in parallel with each other.

5. The manufacturing method of a planetary carrier according to claim 1, wherein
   the two supporting plates include a first supporting plate that has a first through hole and that supports one end of each of the pinion shafts, and a second supporting plate that has a second through hole and that supports the other end of each of the pinion shafts, and
   in the blanking step, the first and second supporting plates are blanked from the plate material and the bridge plate is blanked from a part of the plate material that at least corresponds to the first through hole and the second through hole.

\* \* \* \* \*